United States Patent [19]

Michel

[11] 4,041,876
[45] Aug. 16, 1977

[54] VEHICLE GUIDING SYSTEM

[75] Inventor: Robert Michel, Paris, France

[73] Assignee: Transports-Recherches-Etudes et Groupement d'Interet Economique (Tregie), Rueil-Malmaison, France

[21] Appl. No.: 611,724

[22] Filed: Sept. 9, 1975

[30] Foreign Application Priority Data

Sept. 13, 1974 France .................. 74.31110
Aug. 28, 1975 United Kingdom ............. 35554/75

[51] Int. Cl.² .................. E01B 25/02; E01B 25/28
[52] U.S. Cl. .................. 104/130; 104/141; 104/244.1; 104/245
[58] Field of Search ........... 104/130, 118, 121, 244.1, 104/247, 242, 243, 245, 105, 139, 140, 141, 248

[56] References Cited
U.S. PATENT DOCUMENTS

| 2,575,055 | 11/1951 | Jaeger | 104/245 |
| 3,082,699 | 3/1963 | Schmitz | 104/247 |
| 3,593,665 | 7/1971 | Marty | 104/130 |
| 3,844,224 | 10/1974 | Ishii et al. | 104/130 |
| 3,913,491 | 10/1975 | Auer et al. | 104/130 |

FOREIGN PATENT DOCUMENTS 1,213,453  11/1970  United Kingdom .............. 104/1

Primary Examiner—Robert J. Spar
Assistant Examiner—Carl Rowold
Attorney, Agent, or Firm—Beveridge, DeGrandi, Kline and Lunsford

[57] ABSTRACT

In a vehicle guidance system, a circular-section guidance rail is embraced by a detector on a vehicle. At a fork, where the rail progressively broadens prior to dividing, the rail height is reduced so that a detector, when tilted to select one branch of the fork, has its lowered side between the rail and a side wall of a channel in which the rail is mounted and its raised side riding over the broadened rail.

5 Claims, 6 Drawing Figures

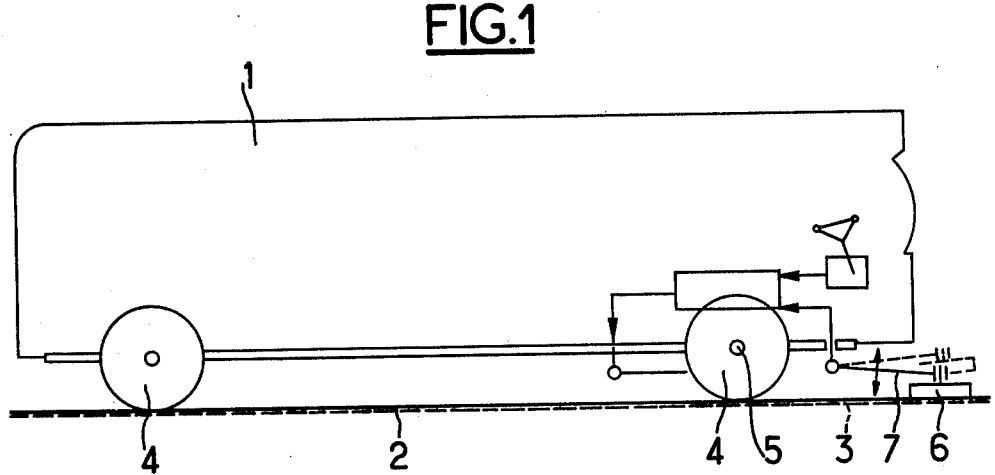
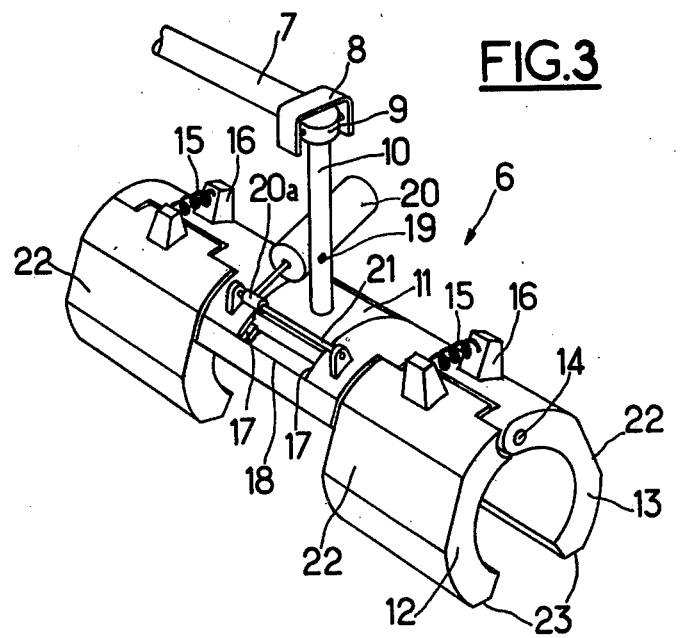

VEHICLE GUIDING SYSTEM

This invention relates to a system for automatically guiding vehicles, running on a track provided with a guiding reference member, with a guidance detector carried on the vehicle in contact with the guiding reference member to supply information as to the position of the vehicle with respect to the said guiding reference member.

It is known to use a reference guiding member of circular section which permits movements of rotation of the detector consequent upon the modifications of position of a vehicle subjected to swaying and rolling movements with respect to the ground.

A guidance system according to the present invention comprises a track having a guidance member of substantially circular cross-section, a fork in the track at which the track forks into two branch tracks, each with its guidance member, the guidance member being mounted at least at the fork in a channel formed along the track, and a guide detector carried on the vehicle for contacting the guidance member to provide the said positional information, the detector having an inner contact surface complementary to the said circular section guidance member, the contact surface embracing the circular section guidance member and ensuring a positive retention of the detector thereon, the detector being mounted for rotation about the axis of the circular section guidance member.

In the preferred form of system embodying the invention, at the fork the circular-section guidance member is progressively broadened and divided into two members of substantially circular section, and each lateral portion of the broadened guidance member defines with the adjacent lateral wall of the channel a retention zone for a part of the detector. Advantageously, the broadened guidance member at the fork has a height less than that of the circular-section guidance member but has on each side a peripheral portion in the form of a part of a circle of the same diameter as the circular section guidance member, so that when the detector is tilted about the axis of the guidance member at a fork, its lowered side is engaged between the guidance member and the adjacent side wall of the channel and its raised side rides over the top of the broadened guidance member.

The known automatic guidance devices have the disadvantage that at forks in the track there is always a break in the reference guiding member. By permitting the detector to tilt to a selected path on one side of the broadened guidance reference member, a system embodying the present invention may be constructed with a continuous guidance member from the track to each branch of the fork and the detector nevertheless maintains contact with the guidance member throughout the forking zone.

In the preferred form, the detector is suspended from a shaft on which is mounted an actuator for tilting the detector with respect to the shaft. In the tilted position, there may be two contacts between the external surface of the detector and the internal surface of the channel, one with a side wall of the channel and another with the base of the channel.

In order that the invention may be better understood, an example of a guidance system embodying the invention will now be described with reference to the accompanying drawings, in which:

FIG. 1 is a diagrammatic representation of a vehicle automatically guided by means of an automatic guidance device embodying the present invention;

FIG. 3 is a perpective view of a detector of a device embodying the present invention for co-operating with the guidance reference member of the track shown in FIG. 2;

Figure 2:
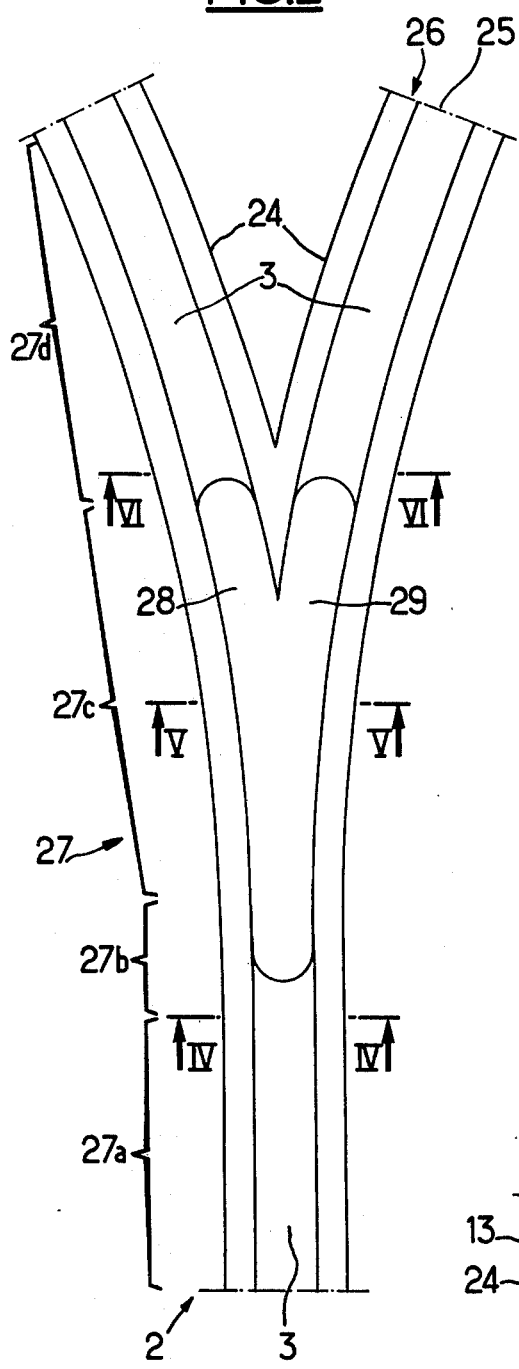
FIG. 2 is a plan view of the track comprising a guidance reference member forming part of the device embodying the present invention.

In FIG. 1, a vehicle 1 moves over a track 2 comprising a guidance reference member 3. The vehicle 1, which is provided with conventional wheels 4, comprises a forward or steering axle 5 and carries a guidance detector 6 which is in contact with the guidance reference member 3. The detector 6 is mounted for rotation at the end of an articulated arm 7, which can be raised, for example by an actuator, not shown, when the vehicle runs on a track without a guidance reference member.

Referring now to FIG. 3, the detector 6 is carried at the free end of the arm 7 by means of a retaining yoke 8, provided for a trunnion 9 in which a rod 10 is freely mounted for rotation, the rod 10 carrying a retaining plate 11. The retaining plate 11 constitutes the supporting member for the detector 6.

The detector 6 comprises a first two-part shoe 12 articulated to a second shoe 13 by two shafts 14, only one of which is seen in FIG. 3, the shoes 12 and 13 being designed to embrace a cylindrical portion of the guidance reference member 3, under the action of springs 15 compressed between lugs 16 mounted on the shoes 12 and 13.

The second shoe 13 is formed with curved runners 17, extending transversely to the length of the shoe 13, these runners sliding on the supporting plate 11. The sliding movement of the runners 17 is restricted by two stops 18 which thus limit the possible inclination of the detector to one side and the other of a neutral median position.

On the rod 10 there is an anchorage point 19 at which an actuator 20 is pivotally mounted. The end 20a of the actuating rod of the actuator is mounted for rotation on a stirrup 21 rigid with the shoe 13.

Operation of the actuator 20 causes the shoe 13 to slide on the retaining plate 11 and thus causes the shoes 12 and 13 to pivot with respect to the longitudinal axis of the detector.

The shoes 12 and 13 comprise lateral guidance surfaces 22 and auxiliary guidance sufaces 23, the latter being situated at the end of the shoes 12 and 13. The lateral guidance surfaces 22 and the auxiliary guidance surfaces 23 are intended for co-operation respectively with the corresponding lateral wall 24 and the base 25 of a channel 26 formed in the track 2, visible in section in FIGS. 4, 5 and 6, when the vehicle arrives at a fork.

The track 2 shown in FIG. 2 has a fork 27 comprising a fork approach zone 27a, a control zone 27b for positioning the detector 6, a selector guidance zone 27c and a fork departure zone 27d.

Figure 5:
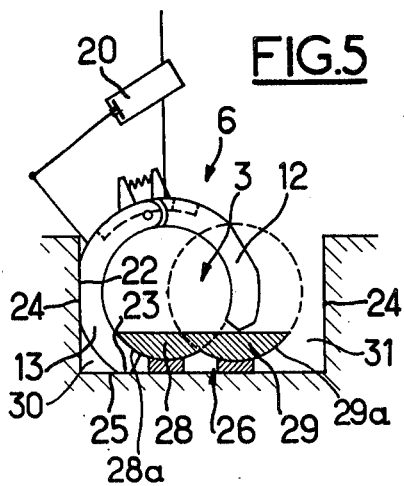

In the selector guidance zone 27c, the circular-section member 3 fixed at the base 25 of the channel 26 is progressively transformed into two guidance members 28 and 29 each having a section in the form of a segment of a circle. As seen in FIG. 5, which shows an intermediate stage in the division of the simple guidance member into two guidance members, the section of the composite guidance member 28-29 is in the form of two overlapping circles from which the upper portions have been cutaway along a horizontal line.

The composite guidance member 28-29 of FIG. 5 comprises external lateral surfaces 28a and 29a of part-circular section which form engagement areas for the shoes 13 and 12 respectively of the detector 6, only one shoe being in contact with its engagement area 28a or 29a in a zone 27c, the branch of the fork which is to be taken determining the selection of the shoe. The base 25 of the channel 26, an external surface 28a or 29a of the composite member 28-29 of FIG. 5 and the corresponding lateral wall 24 of the channel 26 define a path 30 or 31 for the shoe 13 or the shoe 12 respectively of the detector 6.

As shown in FIG. 5, in the zone 27c of the fork 27, the detector 6 is in an inclined position, such that the shoe 13 takes the path 30. There is contact between the base 25 of the channel 26 and the auxiliary guidance surface 23 of shoe 13, between the external surface 28a of the composite guidance member and the internal surface of the shoe 13, and between the lateral wall 24 of the channel 26 and the lateral guidance surface 22 of the shoe 12. Owing to the lack of the upper portions of the overlapping circles in the section of the composite member 28-29, the detector 6 is not stopped at the fork in the path, the shoe 12 which does not take its path 31 riding over the portion 29 of the composite member 28-29.

Thus the periphery of the guidance reference member always has a zone of contact with the detector 6, whatever may be the position of the guidance reference member relative to the detector 6 and whatever the selected path of the vehicle. It will easily be appreciated that on approaching the fork 27, the driver of the vehicle chooses one of the two branches of the fork by causing the detector 6 to tilt to the required extent under the action of the actuator 20.

Figure 4:
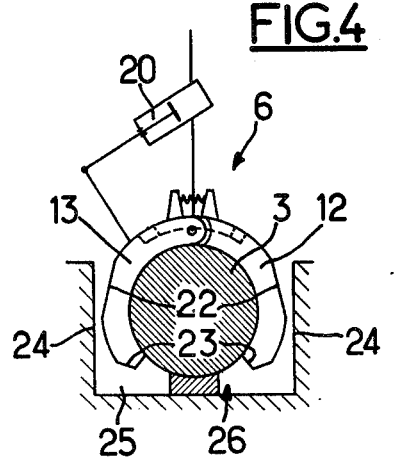
FIGS. 4, 5 and 6 are sectional views showing diagrammatically the positions occupied by the detector of FIG. 3 on the guidance reference member, the sections being taken respectively on the lines IV—IV, V—V, VI—VI of FIG. 2.
Figure 6:
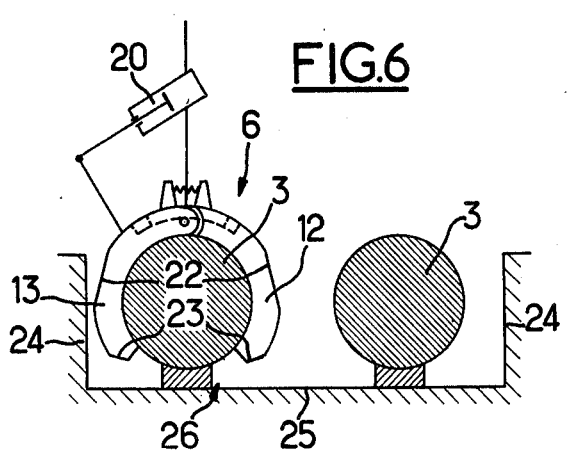

Thus, FIGS. 4, 5 and 6 show successively that the detector 6 first has a vertical median position (FIG. 4), then that the actuator 20 causes the detector 6 to tilt into a position such that it maintains contact with the surface 28a, which causes the vehicle 1 to take the left branch of the fork 27 (FIG. 5), and then that the detector finally returns to its medial vertical position on the guidance member in the left branch, the section of the guidance member having been restored to a full circle (FIG. 6).

The automatic guidance device thus formed permits a simple construction for a guidance track both outside the fork zone and in the fork zone, where the reference guidance member is in a channel, one wall of which constitutes an auxiliary guidance surface. In addition, the cylindrical section of the guidance reference member tends to prevent clogging with dirt and facilitates the running away of water.

The positional information transmitted by the detector is thus always translated into the form of a mechanical displacement which modifies, where necessary, the state of a servo control device, known in itself, capable of changing the direction of conventional steering wheels of the vehicle.

It is of course possible to replace the shoes of the detector, articulated to one another, by shoes mounted for articulation by means of rods on an inclinable support, it being understood that the shoes comprise the guiding surfaces destined for co-operation with the lateral wall of channel and with the base of this latter.

I claim:

1. A guidance system for guiding a vehicle on a track, comprising
    a track having a guidance member of circular cross-section;
    a guide detector carried on a vehicle for contacting the guidance member to provide information as to the position of the vehicle with respect to the guidance member and having an internal contact surface complementary to the said circular-section guidance member, the contact surface extending around more than one half of the circumference of the circular-section guidance member to ensure a positive retention of the detector thereon;
    a fork in the track at which the track forks into two branch tracks, walls extending along the opposite sides of said guidance member at said fork, the guidance member no longer being a single circular member but rather being progressively broadened at the fork until it divides into two guide members, one for each branch track;
    means mounted on the vehicle for tilting the detector about the axis of its internal contact surface to a selected side of a median position to select one branch of the fork;
    the broadened guidance member at the fork having a height less than that of the circular-section guidance member but having on each side a lower peripheral portion in the form of a part of a circle of the same diameter as the circular-section guidance member, whereby when the detector is tilted at a fork, a raised side thereof rides over the said broadened guidance member, each of said lower portions defining with the adjacent said wall a means for positively retaining the lower side of the tilted detector in operative engagement with said guidance member.

2. A guidance system as defined in claim 1 in which the detector, when tilted about the axis of its internal contact surface at a fork, has a first external surface engaging a said wall alongside said fork and a second external surface engaging the base of the channel.

3. A guidance system as defined in claim 1, in which the detector comprises a pair of relatively movable shoes which together define said internal contact surface.

4. A guidance system as defined in claim 1, in which the detector is suspended from a shaft, said means for tilting the detector being an actuator means mounted on said shaft.

5. A guidance system as defined in claim 4, comprising a curved plate fixed to the base of the said shaft, the detector being mounted for sliding motion with respect to the curved plate along a curved path to permit it to tilt with respect to the shaft at a fork.

* * * * *